United States Patent Office 3,784,517
Patented Jan. 8, 1974

3,784,517
PREPARATION OF POLYBENZIMIDAZOLES IN THE PRESENCE OF A SULFONE SOLVENT
Frederick L. Hedberg, Dayton, Ohio, and Carl S. Marvel, Tucson, Ariz., assignors to the United States of America as represented by the Secretary of the Air Force
No Drawing. Filed June 27, 1972, Ser. No. 266,814
Int. Cl. C08g 33/02
U.S. Cl. 260—63 R    15 Claims

ABSTRACT OF THE DISCLOSURE

A one-step process for preparing polybenzimidazoles is disclosed that comprises reacting an aromatic tetraamino compound with the diphenyl ester or anhydride of an aromatic dicarboxylic acid in the presence of an aliphatic or aromatic sulfone solvent or reaction medium. The process provides in quantitative yields high molecular weight products that are particularly suitable for use in fiber formation.

FIELD OF THE INVENTION

The invention relates to a process for preparing polybenzimidazoles. In a more specific aspect it relates to a process involving a one-step condensation reaction for preparing high molecular weight polybenzimidazoles. In another aspect, the invention relates to a novel polybenzimidazole.

BACKGROUND OF THE INVENTION

The conventional process for preparing polybenzimidazoles is described by C. S. Marvel et al. in U.S. Pat. No. 3,174,974. As disclosed in this patent, the process involves a two-stage procedure. In the first stage, the reactants are melt polymerized until a polymer of intermediate molecular weight is obtained. Thereafter, in the second stage of the process, the melt formed polymer is pulverized and subjected to solid state powder polymerization to produce a product of high molecular weight. While this two-step process is the common commercial method for producing polybenzimidazoles, several difficulties are encountered in carrying out the method. The very nature of the two stages of the method, i.e., the melt polymerization step and the solid state powder polymerization step, makes temperature control an important factor. And it is difficult, if not impossible, to control the temperature so as to maintain an even temperature in order that crosslinking of the polymer will not occur. Because crosslinking does generally occur, it is necessary to remove the crosslinked polymer, which is insoluble in N,N-dimethylacetamide, before the product is suitable for use. This, of course, in addition to the added inconvenience of the separation step that must be performed, reduces the product yield.

The process for preparing polybenzimidazoles is carried out in an inert atmosphere. During grinding of the prepolymer from the first step, air is absorbed on the surface of the prepolymer. The difficulty in effecting complete removal of this absorbed air before heating constitutes another disadvantage in the prior art method.

Other patents have issued that disclose methods for preparing polybenzimidazoles, but these patents, like the above-discussed Marvel et al. patent, generally disclose similar methods that involve two-stage procedures. For example, in U.S. Pat. No. 3,433,772 a two-stage method is described in which the first stage is conducted in the presence of an inert organic additive to inhibit polymer foaming.

It is an object of this invention, therefore, to provide an improved process for preparing polybenzimidazoles.

Another object of the invention is to provide a one-step process for preparing polybenzimidazoles.

A further object of the invention is to provide a process for preparing polybenzimidazoles in which temperature control is unnecessary and reaction temperatures lower than those conventionally used can be employed.

Still another object of the invention is to provide a process for preparing polybenzimidazoles in which crosslinking of the polymer does not occur.

A still further object of the invention is to provide a process for preparing polybenzimidazoles that permits constant mixing of the reaction mixture, thereby promoting the reaction and reducing reaction time as well as increasing product yield.

Another object of the invention is to provide a new polybenzimidazole.

Other objects and advantages of the invention will become apparent to those skilled in the art upon consideration of the accompanying disclosure.

SUMMARY OF THE INVENTION

Broadly speaking, the present invention resides in a process for preparing polybenzimidazoles which comprises polymerizing in an inert atmosphere (1) certain tetraamines, as described below, and the diphenyl ester of an aromatic dicarboxylic acid, the diphenyl ester of a heterocyclic dicarboxylic acid in which the carboxyl groups are attached to carbon atoms of pyridine, pyrazine, furan or quinoline, or an anhydride of an aromatic dicarboxylic acid or (2) an aromatic compound containing ortho positioned diamino groups and a phenylcarboxylate ester group, the polymerizing being conducted under reflux conditions in a solvent or reaction medium consisting essentially of an aliphatic or aromatic sulfone.

The tetraamines that can be used in the practice of the present process are those that have the following structural formulae:

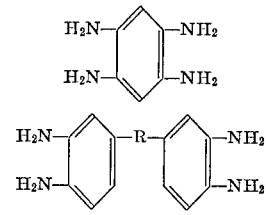

wherein R is a carbon to carbon bond; a divalent hydrocarbon radical, such as —CH$_2$—,

or —CH=CH—; —O—;

or —S—. Examples of tetraamines corresponding to the foregoing formulae include 1,2,4,5-tetraaminobenzene; 3,3′,4,4′-tetraaminodiphenyl; 3,3′,4,4′-tetraaminodiphenyl ether; bis(3,4-diaminophenyl) - 1,2 - ethylene; 3,3',4,4'-tetraaminodiphenylmethane; 3,3',4,4'-tetraamidodiphenyl-2,2-propane; 3,3',4,4'-tetraaminobenzophenone; and 3,3',4,4'-tetraaminodiphenyl sulfide.

As indicated above the tetraamines, which contain two orthodiamino reactive centers, are reacted with diphenyl esters of certain dicarboxylic acids. Examples of suitable diphenyl esters are the phenyl esters of isophthalic acid, terephthalic acid, naphthalene-1,4-dicarboxylic acid, naphthalene-1,6-dicarboxylic acid, naphthalene-2,6-dicarboxylic acid, pyridine-2,5-dicarboxylic acid, pyridine-2,6-dicarboxylic acid, pyrazine-2,5-dicarboxylic acid, furan-2,5-dicarboxylic acid, quinoline 2,6-dicarboxylic acid, and the like. Furthermore, aromatic dicarboxylic acids can be employed in which the two carboxylic groups are on separate nuclei, the nuclei being joined by a carbon-to-carbon bond, a methylene group, an ether linkage or other similar linking group. Examples of this latter class of compounds include the diphenyl esters of the diacids of bibenzoic acid, 4,4'-biphenyl dicarboxylic acid, diphenyl-ether-4,4'-dicarboxylic acid, diphenyl-methane-4,4'-dicarboxylic acid and the like.

In one embodiment of the invention, aromatic compounds are employed that contain ortho positioned diamino substituents and a phenyl-carboxylate ester substituent. Examples of this class of compounds in which all of the functional groups are attached to a single ring or to a fused ring include the phenyl esters of 3,4-diaminobenzoic acid and 6,7-diamino-3-naphthoic acid. Other suitable compounds are those in which two reactive centers are located on different aromatic nuclei that are joined together through a carbon-to-carbzon bond, a divalent hydrocarbon radical; —O—;

or —S—. Examples of such compounds include the phenyl esters of 3',4'-diamino-3-biphenyl carboxylic acid and m-(3,4-diaminophenoxy)-benzoic acid. It is to be understood that the compounds described in this paragraph include all necessary reactive sites for the formation of the benzimidazole nuclei since they react with one another to produce polymeric materials.

For a somewhat more complete description of the reactants utilized in the present process as well as formulae of the recurring units of the polymers and an equation illustrating a representative polymerization reaction, the above-cited U.S. patent to C. S. Marvel et al. can be referred to. Insofar as these portions of the patent disclosure are concerned, the patent is incorporated herein by reference.

The improvement obtained in preparing polybenzimidazoles by the present process resides in the discovery that aliphatic or aromatic sulfones can be utilized as the solvent or reaction medium in the polymerization reaction. Examples of solvents that can be employed include n-propyl sulfone, n-butyl sulfone, tetramethylene sulfone (sulfolane), pentamethylene sulfone, phenyl sulfone, ethyl phenyl sulfone, phenyltolyl sulfone, chlorophenylphenyl sulfone, and the like. Of the sulfones it is usually preferred to employ sulfolane or phenyl sulfone.

In conducting the process of this invention, it is generally preferred to first add the solvent to the reactor. Thereafter, the monomers are charged to the reactor in any desired order, or they can be introduced simultaneously. Furthermore, the monomers and solvent can be mixed at room temperature and then charged to the reactor. When an aromatic compound containing ortho positioned diamino substituents and a phenyl-carboxylate ester substituent is employed, this monomer is, of course, the sole reactant to be added or mixed with the solvent.

As charged to the reactor, the solvent is in liquid or solid form depending upon the melting point of the sulfone. Certain of the solvents, such as sulfolane, are liquid at room temperature in which case it is only necessary to introduce the compound per se into the reactor. However, in the case of sold sulfones, such as phenyl sulfone, a low boiling aromatic hydrocarbon is added to provide a solution or suspension of the sulfone. The solvent for the solid sulfones are those having a boiling point ranging from about 100 to 150° C., such as ethyl benzene, toluene, and the xylenes. Low boiling compounds are utilized in order that they will boil off before polymerization commences and after the sulfone is in liquid form so that it can function as a solvent for the reactants. Alternatively, the sulfone when in solid form can be added as such to the reactor which is then heated to at least the melting point of the sulfone so as to convert it to a liquid.

When two monomers are utilized, i.e., a tetraamine and an ester, substantially equimolar amounts of the compounds are added to the reactor containing the solvent. The actual quantity of monomers, or monomer in the case of an aromatic compound containing ortho positioned diamino substituents and a phenyl-carboxylate ester substituent, that are charged will depend upon the size of the reactor. However, the quantities are such that the resulting polymer product constitutes from about 5 to 15 weight percent of the total reaction mixture.

After the monomers or monomer are charged to the reactor, they go into solution in the solvent. Depending upon the system, this may occur at room temperature, but in any event the monomers are in solution in the solvent by the time the reaction mixture temperature reaches about 200 to 250° C. The reaction mixture is deaerated before heating is commenced, generally by bubbling an inert gas, such as nitrogen, helium or argon, through the solution or suspension for from about 10 to 60 minutes. In the case of a liquid solvent, heating of the reactor is then commenced until the reaction mixture is at a temperature corresponding to the boiling point of the solvent. When a solid solvent is used, the reactor is initially heated to about the boiling point of the aromatic hydrocarbon. This temperature is maintained until the aromatic has boiled off after which the temperature is increased to the boiling point of the sulfone solvent. The reaction is thereafter continued under reflux conditions with the inert atmosphere being maintained in the reaction zone.

The reflux temperature will, of course, depend upon the particular solvent employed, but it is well within the skill of the art to conduct the polymerization under reflux conditions. When utilizing sulfolane or phenyl sulfone as the solvent, the reflux temperatures at atmospheric pressure range from 265 to 275° C. and from 365 to 375° C., respectively. Should higher reflux temperatures be desired, it is within the skill of the art to conduct the polymerizations under superatmospheric pressures. However, it is preferred to operate at about atmospheric pressure although when using sulfolane as the solvent superatmospheric pressures can be employed with advantage if it is desired to shorten the polymerization reaction time by increasing the reflux temperature. Atmospheric pressure is preferred because the by-products, water and phenol, can be continuously removed, thereby driving the reaction to completion.

As the reaction proceeds under reflux conditions while continuously stirring the reaction mixture, polymer in particulate form precipitates from solution. It is to be understood that any aromatic compound that may have been used to dissolve or suspend a solid sulfone will have boiled off prior to the time that reflux conditions are reached. The polymerization reaction is usually continued for a period of time sufficient to provide a polymer having an inherent viscosity of at least 0.5, which is an indication that a high molecular weight polymer has been formed in a substantially quantitative yield. The actual polymerization period varies with the particular sulfone solvent and/or monomers employed in the polymerization. However, the time is usually in the range of 1 to 75 hours.

At the end of the polymerization period, a ketone is added to the reaction mixture, or alternatively the reaction mixture is poured into a vessel containing a ketone. The preferred ketone is acetone, but other ketones, such as cyclohexanone, 2-pentanone, 3-pentanone, 2-hexanone, or 3-hexanone, can be used. The ketone functions to cause precipitation of any small amount of polymer that may be in solution in the sulfone solvent. Also, the ketone acts to partially separate solvent and polymer since the sulfone is soluble in the ketone. If an aliphatic sulfone is used as the solvent, a low boiling alcohol, such as methanol or ethanol, can be used instead of a ketone or in admixture with a ketone. When an aromatic sulfone is used, only a ketone can be employed because an alcohol will not dissolve such a sulfone.

The ketone must be added to the reaction mixture before it cools to a temperature below that at which the sulfone solvent solidifies. When sulfolane is used, this can be accomplished at room temperature since sulfolane is a liquid at that temperature. However, with a solvent which is a solid at room temperature, the ketone must be added to the reaction mixture before its temperature falls below the melting point of the solvent. For example, with phenyl sulfone having a melting point of about 125° C., the ketone must be added before the reaction mixture temperature falls below about 130° C. If this procedure is not followed, the polymer will be contained in solidified solvent.

As an alternative to the procedure described in the preceding paragraph, the reaction mixture without addition of a ketone can be filtered to separate the polymer. However, it is to be understood that in cases where the solvent is a solid at room temperature, the reaction mixture must be filtered at a temperature above the melting point of the sulfone solvent.

The reaction mixture when a ketone is added is also filtered to recover the polymer. The separated polymer is in either procedure then washed with a ketone, which is preferably acetone, and dried in a vacuum oven at a temperature ranging from about 100 to 200° C. for a period of about 5 to 30 hours. The polybenzimidazole so produced is now in a condition suitable for the preparation of fibers, films and other useful articles.

A more complete understanding of the invention can be obtained by referring to the following illustrative examples which are not intended, however, to be unduly limitative of the invention.

Example I

A run was conducted in which 8.035 grams of 3,3',4,4'-tetraaminodiphenyl (0.0375 mol) and 11.937 grams of diphenylisophthalate (0.0375 mol) were charged to a 1-neck, 500 milliliter round-bottom flask containing 200 milliliters of freshly distilled sulfolane. The resulting mixture was stirred and deaerated for 30 minutes by bubbling nitrogen through a filter stick whose sintered glass end was inserted below the level of the mixture. During this 30-minute period, a yellow solution was formed. The filter stick was then removed and immediately replaced with a straight distilling adapter through the side arm of which a flow of nitrogen was maintained and at the outlet of which was placed a Dean-Stark trap and air condenser. The distilling adapter and the side arm of the Dean-Stark trap were wrapped with a layer of commercial aluminum foil.

The reaction mixture was then stirred and refluxed under nitrogen for 72 hours. The reflux temperature was about 275° C. The sulfolane condensed in the distilling adapted and returned to the reaction vessel while the water and phenol evolved during the reaction collected in the condenser and the Dean-Stark trap.

At the end of the reflux period, the reaction mixture, which was now a suspension of yellow particulate solids, was allowed to cool to room temperature. The cooled reaction mixture was then poured while stirring into a mixture of 1 liter of methanol and 500 milliliters of acetone. The precipitate was then removed from the reaction mixture by filtration, washed with acetone, and dried for 20 hours under a vacuum at 160° C. Since the product was very hygroscopic, as is characteristic of polybenzimidazoles, it was weighed immediately after removal from the cooled vacuum oven. The amount of poly[2,2'-(m-phenylene)-5,5'-bibenzimidazole] obtained was 11.43 grams which represented a yield of 99 percent.

The product was subjected to infrared analysis, and the spectrum was identical to that of poly[2,2'-(m-phenylene)-5,5'-bibenzimidazole]. The product was dissolved in N,N-dimethylacetamide so as to provide a 0.5 percent solution. The inherent viscosity of this solution at 30° C. was 0.69.

Example II

A run was carried out in which diphenyl terephthalate and 3,3'4,4'-tetraaminodiphenyl were polymerized in the presence of phenyl sulfone as the solvent. The procedure followed was essentially the same as that described in Example I. Thus, 5.357 grams of diphenyl terephthalate (0.0250 mol) and 7.958 gram of 3,3',4,4'-tetraaminodiphenyl (0.0250 mol) were added to 200 grams of phenyl sulfone mixed with 50 milliliters of toluene. The resulting mixture was deaerated with nitrogen and stirred while heating. The reaction mixture changed to an orange solution as the toluene was driven off. After a heating period of one hour, the pot temperature reached 270° C. at which point a small amount of precipitate was present. Refluxing was continued for 5.5 hours at which time the yellow suspension was cooled to 150° C. and poured with stirring into 2.5 liters of acetone. The reaction flask was washed with 500 milliliters of additional acetone after which the yellow precipitate was separated by filtration and blended with 1.5 liters of acetone. The product was then continuously extracted for 24 hours with ethanol and for 24 hours with benzene. The product was dried in a vacuum oven at 120° C. to a constant weight, thereby providing 7.70 grams of poly[2,2' (p-phenylene)-5,5'-bibenzimidazole], which represented a yield of 100 percent. A 0.5 percent solution of the product is sulfuric acid had an inherent viscosity of 1.03 at 30° C.

Example III

A run was carried out in which a mixture of 15.92 grams of diphenyl isophthalate (0.0500 mol), 10.71 grams of 3,3',4,4'-tetraaminodiphenyl (0.0500 mol) and 100 grams of phenyl sulfone were weighed into a 500 milliliter, three-necked round bottom flask. The flask was equipped with a mechanical stirrer in the center neck and a short distilling head above a gas inlet equipped distilling adapter in a second neck. One hundred milliliters of p-xylene was added to the flask, and the resulting mixture was stirred and deaerated with nitrogen for 20 minutes. The reaction mixture was then heated and the xylene was distilled off over a one-hour period. The pot temperature was raised to 370° C. and maintained at this temperature for a period of one hour. During this time phenol and water distilled off and a tan suspension formed. The reaction mixture was then cooled to about 150° C. and poured into one liter of acetone. The precipitate was filtered, washed three times in a blender with acetone, and dried for 16 hours in a vacuum oven at 120° C.

The product, namely, poly[2,2'-(m-phenylene)-5,5'-bibenzimidazole], did not dissolve in refluxing N,N-dimethylacetamide (DMAC). However, the product readily dissolved in refluxing DMAC containing one weight percent of lithium chloride. Concentrations of 5, 10, 15, and 20 weight percent were obtained that contained no undissolved residue. The inherent viscosity of a 0.3 weight percent solution was 0.91.

Example IV

A run was conducted in which poly[2,2'-(m-phenylene)-5,5'-di(benzimidazole)ketone] was prepared by polymerizing diphenyl-isophthalate and 3,3',4,4'-tetraaminobenzophenone. The procedure followed in this run was essentially the same as that described in Example I. Thus, a mixture of 6.36 grams of diphenyl isophthalate (0.0200 mol), 5.966 grams of 3,3',4,4'-tetraaminobenzophenone and 300 milliliters of sulfolane was deaerated with nitrogen for 20 minutes. The reaction mixture was stirred and refluxed under nitrogen for 40 hours during which time water and phenol were evolved. The dark brown solution that was obtained was cooled to 25° C., giving a brownish-yellow precipitate, which was poured while stirring into 1500 milliliters of methanol. The precipitate was separated from the reaction mixture, washed with methanol, and dried in a vacuum oven at 125° C. for 24 hours. There was obtained 4.80 grams of poly[2,2'-(m-phenylene)-5,5'-di(benzimidazole)ketone] which represented a yield of 71 percent. A 0.5 percent solution of the product in sulfuric acid at 30° C. gave an inherent viscosity of 0.22.

The polymer was very hygroscopic, as are other polybenzimidazoles, and even after further drying in vacuo at 190° C. for 72 hours contained 0.8 weight percent water by analysis. The product was analyzed on the basis of the empirical formula for poly[2,2'-(m-phenylene)-5,5'-di(benzimidazole)ketone], namely, $$C_{21}H_{12}N_4O \cdot 0.8H_2O.$$

The following are the results of this analysis. Calculated (percent): C, 71.90; H, 3.90; N, 15.97; O, 8.21. Found (percent): C, 71.93, 71.81; H, 4.20, 4.07; N, 15.74, 15.64; O, 7.75, 7.78. The product obtained is a new species of polybenzimidazoles.

From a consideration of the foregoing examples, it is seen that the present process provides several advantages over the method conventionally used in the preparation of polybenzimidazoles. Thus, the present polymerization process involves only one step whereas the prior art method requires two steps. Furthermore, in carrying out the present process it is unnecessary to take special precautions to control temperature whereas in the conventional process the maintenance of temperature control is an important factor. Solvation of transition states by polar sulfonyl groups of the solvent results in a lower energy requirement to activate the polymerization. This lower energy of activation permits much lower reaction temperatures than are conventionally utilized so that there is less chance of crosslinking occurring during the polymerization. In the practice of the present process constant mixing is possible throughout the course of the reaction, thereby facilitating contact between reactive end-groups. In the conventional prior art process involving a solid state reaction, end-groups may be trapped in positions where they can only crosslink. In the present solution polymerization process, this problem of crosslinking cannot occur. When proceeding in accordance with the present process, the by-products, water and phenol, are driven out of the reaction mixture by the boiling solvent whereas in the conventional process these materials are trapped in the polymer. Still further, the solution or suspension of monomers is easily deaerated whereas removal of air from a mixture of solids is difficult to accomplish.

Modifications of the present invention will become apparent to those skilled in the art upon consideration of the foregoing disclosure. Such modifications clearly fall within the spirit and scope of the invention.

We claim:
1. In a process for producing polybenzimidazoles by polymerizing a substantially equimolar mixture of a tetraamine having the following structural formulae:

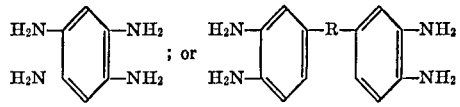

wherein R is a carbon-to-carbon bond, a divalent hydrocarbon radical, —O—,

or —S—; and the diphenyl ester of an aromatic dicarboxylic acid, the diphenyl ester of a heterocyclic dicarboxylic acid in which the carboxyl groups are attached to carbon atoms of pyridine, pyrazine, furan or quinoline, or an anhydride of an aromatic dicarboxylic acid, the improvement which comprises conducting the polymerization in an inert atmosphere under reflux conditions in the presence of a solvent consisting essentially of an aliphatic or aromatic sulfone, the sulfone being inert to the polymerization reaction.

2. The process according to claim 1 in which the solvent is sulfolane and the polymerization is carried out at atmospheric pressure and at a temperature ranging from about 265 to 275° C.

3. The process according to claim 1 in which the solvent is phenyl sulfone and the polymerization is carried out at atmospheric pressure and at a temperature ranging from about 365 to 375° C.

4. The process according to claim 1 in which the polymerization period ranges from about 1 to 75 hours; at the end of the polymerization period a ketone is mixed with the reaction mixture containing polymer in particulate form when the solvent is an aromatic sulfone, and a ketone, an alcohol or a mixture thereof is mixed with the reaction mixture when the solvent is an aliphatic sulfone; and polymer is separated from the resulting mixture.

5. The process according to claim 4 in which the solvent is an aromatic sulfone, which is a solid at room temperature, and the ketone and the reaction mixture are mixed before the temperature of the reaction mixture falls below the melting point of the aromatic sulfone.

6. The process according to claim 5 in which the solvent is phenyl sulfone.

7. The process according to claim 6 in which the ketone is acetone.

8. The process according to claim 7 in which the polymer is separated by filtration and washed with acetone.

9. A process according to claim 1 in which the solvent is an aromatic sulfone which is dissolved or suspended in an aromatic hydrocarbon having a boiling point ranging from about 100 to 150° C.; the reaction mixture is initially heated to a temperature corresponding to about the boiling point of the aromatic hydrocarbon, the temperature being maintained for a period of time sufficient to boil off the aromatic hydrocarbon; and the temperature is then increased to the boiling point of the aromatic sulfone.

10. The process according to claim 1 in which a substantially equimolar mixture of 3,3',4,4'-tetraaminodiphenyl and diphenylisophthalate is polymerized.

11. The process according to claim 1 in which a substantially equimolar mixture of 3,3',4,4'-tetraaminodiphenyl and diphenyl terephthalate is polymerized.

12. The process according to claim 1 in which a substantially equimolar mixture of 3,3',4,4'-tetraaminobenzophenone and diphenylisophthalate is polymerized.

13. In a process for producing polybenzimidazoles by polymerizing an aromatic compound containing ortho positioned diamino groups and a phenylcarboxylate ester group, the improvement which comprises conducting the polymerization in an inert atmosphere under reflux conditions in the presence of a solvent consisting essentially of an aliphatic or aromatic sulfone, the sulfone being inert to the polymerization reaction.

14. The process according to claim 1 in which the sulfone is selected from the group consisting of n-propyl sulfone, n-butyl sulfone, sulfolane, pentamethylene sulfone, phenyl sulfone, ethyl phenyl sulfone, phenyltolyl sulfone, and chlorophenylphenyl sulfone.

15. The process according to claim 13, in which the sulfone is selected from the group consisting of n-propyl sulfone, n-butyl sulfone, sulfolane, pentamethylene sulfone, phenyl sulfone, ethyl phenyl sulfone, phenyltolyl sulfone, and chlorophenylphenyl sulfone.

References Cited
UNITED STATES PATENTS

| | | | |
|---|---|---|---|
| 3,174,947 | 3/1965 | Marvel et al. | 260—47 |
| 3,313,783 | 4/1967 | Iwakura et al. | 260—78 |
| 3,433,772 | 3/1969 | Chenevey et al. | 260—78.4 |

LESTER L. LEE, Primary Examiner

U.S. Cl. X.R.

260—30.8 R, 32.6 N, 47 CP, 78 A, 78 TF, 78.4 R, 78.4 E